(12) United States Patent
Hsu et al.

(10) Patent No.: US 11,620,575 B2
(45) Date of Patent: Apr. 4, 2023

(54) INTERACTIVE AND DYNAMIC MAPPING ENGINE (IDME)

(71) Applicant: AT&T Intellectual Property I, L.P., Atlanta, GA (US)

(72) Inventors: Pei-En Pamela Hsu, Berkeley Heights, NJ (US); Eshrat Huda, Hillsborough, NJ (US); Mukundan Sarukkai, Manalapan, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 300 days.

(21) Appl. No.: 16/903,544

(22) Filed: Jun. 17, 2020

(65) Prior Publication Data

US 2021/0398011 A1    Dec. 23, 2021

(51) Int. Cl.
| | | |
|---|---|---|
| G06F 16/245 | (2019.01) | |
| G06F 40/40 | (2020.01) | |
| G06N 20/00 | (2019.01) | |
| G06N 5/02 | (2006.01) | |
| G06N 5/04 | (2006.01) | |
| G06Q 10/10 | (2012.01) | |
| G06N 5/022 | (2023.01) | |
| G06N 5/045 | (2023.01) | |
| G06Q 10/105 | (2023.01) | |

(52) U.S. Cl.
CPC .......... *G06N 20/00* (2019.01); *G06F 16/245* (2019.01); *G06F 40/40* (2020.01); *G06N 5/02* (2013.01); *G06N 5/022* (2013.01); *G06N 5/045* (2013.01); *G06Q 10/105* (2013.01)

(58) Field of Classification Search
CPC .......... G06N 20/00; G06N 5/02; G06N 5/022; G06N 5/045; G06N 3/006; G06F 16/245; G06F 40/40; G06F 40/30; G06F 16/24522; G06Q 10/105
See application file for complete search history.

(56) References Cited

U.S. PATENT DOCUMENTS

| | | | | |
|---|---|---|---|---|
| 10,673,880 | B1* | 6/2020 | Pratt | H04L 63/1433 |
| 2018/0018590 | A1* | 1/2018 | Szeto | G06N 20/10 |
| 2018/0239829 | A1* | 8/2018 | Dialani | G06Q 50/01 |
| 2018/0330258 | A1* | 11/2018 | Harris | G06N 5/022 |
| 2020/0082296 | A1* | 3/2020 | Fly | G06F 17/18 |
| 2020/0160229 | A1* | 5/2020 | Atcheson | G06N 20/00 |
| 2020/0310888 | A1* | 10/2020 | Gopalan | G06F 8/34 |
| 2020/0311163 | A1* | 10/2020 | Ma | G06Q 50/01 |
| 2021/0081837 | A1* | 3/2021 | Polleri | G06N 5/022 |
| 2021/0149886 | A1* | 5/2021 | Zheng | G06F 16/243 |
| 2021/0192283 | A1* | 6/2021 | Guo | G06N 3/08 |
| 2021/0192395 | A1* | 6/2021 | Sainani | H04L 41/22 |
| 2021/0224306 | A1* | 7/2021 | Choudhary | G06F 3/0237 |

* cited by examiner

*Primary Examiner* — Jorge A Casanova
(74) *Attorney, Agent, or Firm* — Guntin & Gust, PLC; Robert Gingher

(57) ABSTRACT

Methods, systems, and apparatuses, among other things, may provide for an interactive dynamic mapping engine (iDME) for business intelligence, which may interactively obtain information for user devices from sources and schema unknown to the user devices.

20 Claims, 10 Drawing Sheets

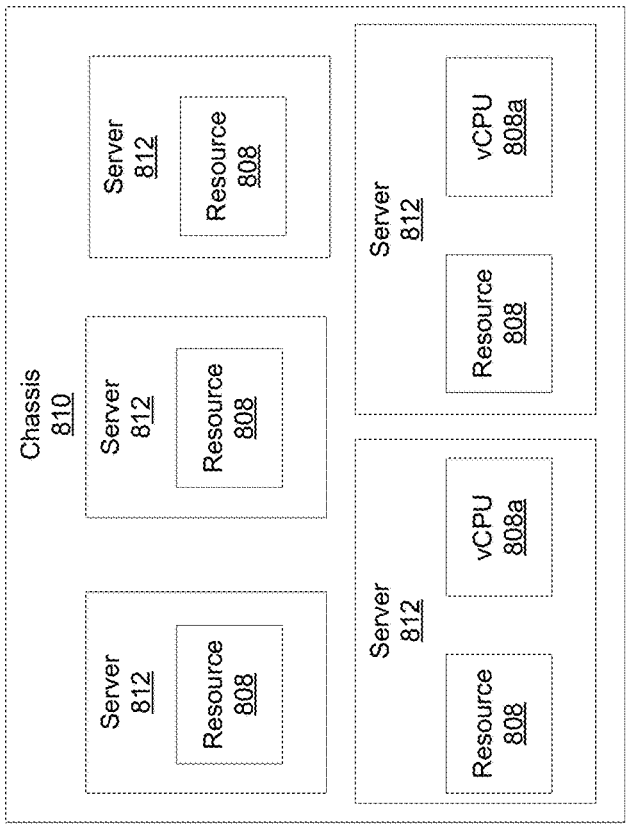
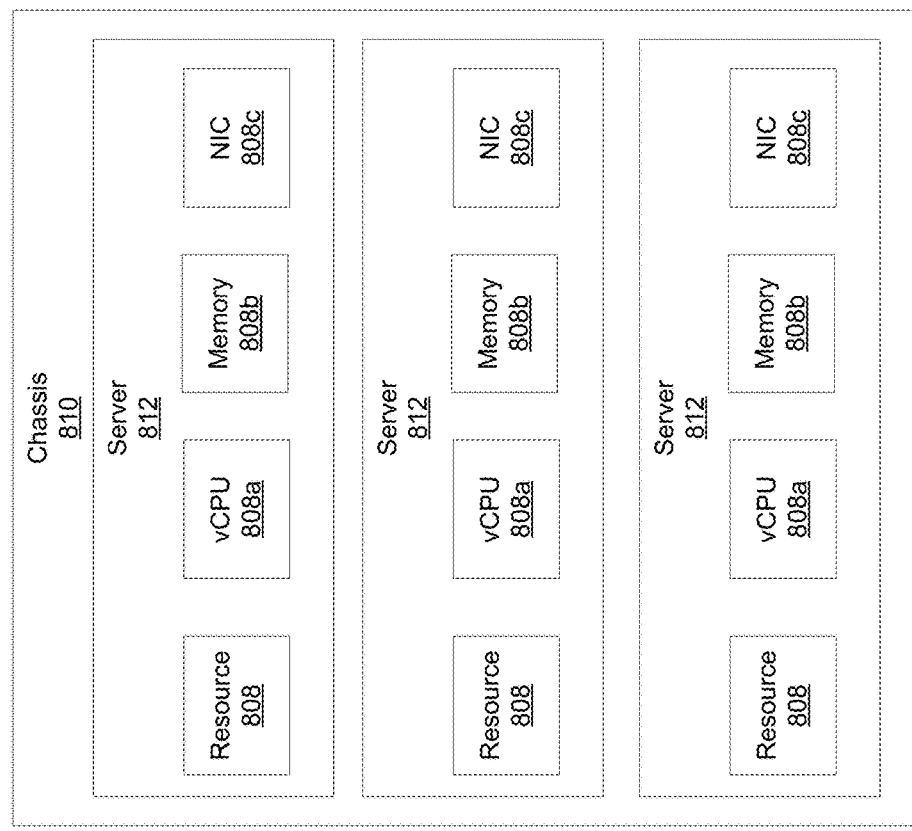
FIG. 8B

INTERACTIVE AND DYNAMIC MAPPING ENGINE (IDME)

BACKGROUND

The world generates and presents an enormous amount of data that humans struggle to process and convert into actionable decision-making steps in a timely manner every day. For example, queries are pre-created and the back-end design relies on an algorithm that is static. Moreover, user query patterns retrieve information for users across organizations and platforms and roles they perform in a static fashion without any differentiation for the individual user (e.g., two different people in the same organization or role will receive the same query response for a certain question). Because data inquires rely on static reports (e.g., reports that are defined beforehand and are not subject to be customized on demands), a user is likely to only find part of the report contents are useful, while the rest of the desired data remains unavailable in the reports.

Typical machine learning algorithms do not dynamically adjust to a user pattern, e.g., how the user asks a question and the response the user expects to see, e.g., user query patterns retrieve information for user devices across organizations, platforms, and roles in a static manner or fashion without any differentiation for the individual user (e.g. two different people in the same organization or role may receive the same query response for a certain question).

Furthermore, data retrievals have become a challenge that requires domain knowledge and complicated database SQL development on top of access of multiple data sources. To ordinary users at a workplace, hunting for desired data can be both time consuming and difficult without engaging a team of domain SMEs. For example, it typically requires domain knowledge and data scientist skills to identify the data mappings before response data becomes meaningful information of a given data inquiry. Thus, converting large quantities of technical data of data sources unknown to the end user into an answer meaningful to the user of the data inquiry has become a challenge at the workplace.

SUMMARY

Methods, systems, and apparatuses, among other things, may provide for an interactive dynamic mapping engine (iDME) for business intelligence, which may interactively obtain information for users from sources and schema unknown to the users.

In an example, an apparatus may include a processor and a memory coupled with the processor that effectuates operations. The operations may include defining a first base model of a machine learning model, e.g., where the first base model includes initial domain knowledge or a starting knowledge base for novice users. Moreover, the machine learning model may collect user inputs including one or more queries for data and the machine learning model may build a user query profile based on a pattern of the inputs. Furthermore, the machine learning model may integrate the user query profile with the first base model of the machine learning model and return a result of the one or more queries for data.

In an example, the machine learning model may evaluate a query or returned result of the queries for data. For example, the machine learning model may learn a user pattern, e.g., based on determining a number of user inputs satisfies a pattern threshold. Moreover, the machine learning model may integrate the user pattern with the first base model of the machine learning model and stage a self-leaning model of the machine learning model based on the first base model. Furthermore, the machine learning model may learn a mature usage pattern based on the first base model and the self-learning model. For example, the machine leaning model may determine a number of matured patterns reaches a matured pattern threshold value or collect user feedback for satisfaction comparison).

In an example, the machine learning model may integrate the mature usage pattern with the first base model to form a matured model. Moreover, the machine learning model may activate the matured model as a second base model for future evolutions of the machine learning model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

FIG. 8B is a representation of an exemplary hardware platform for a network.

Figure 1:
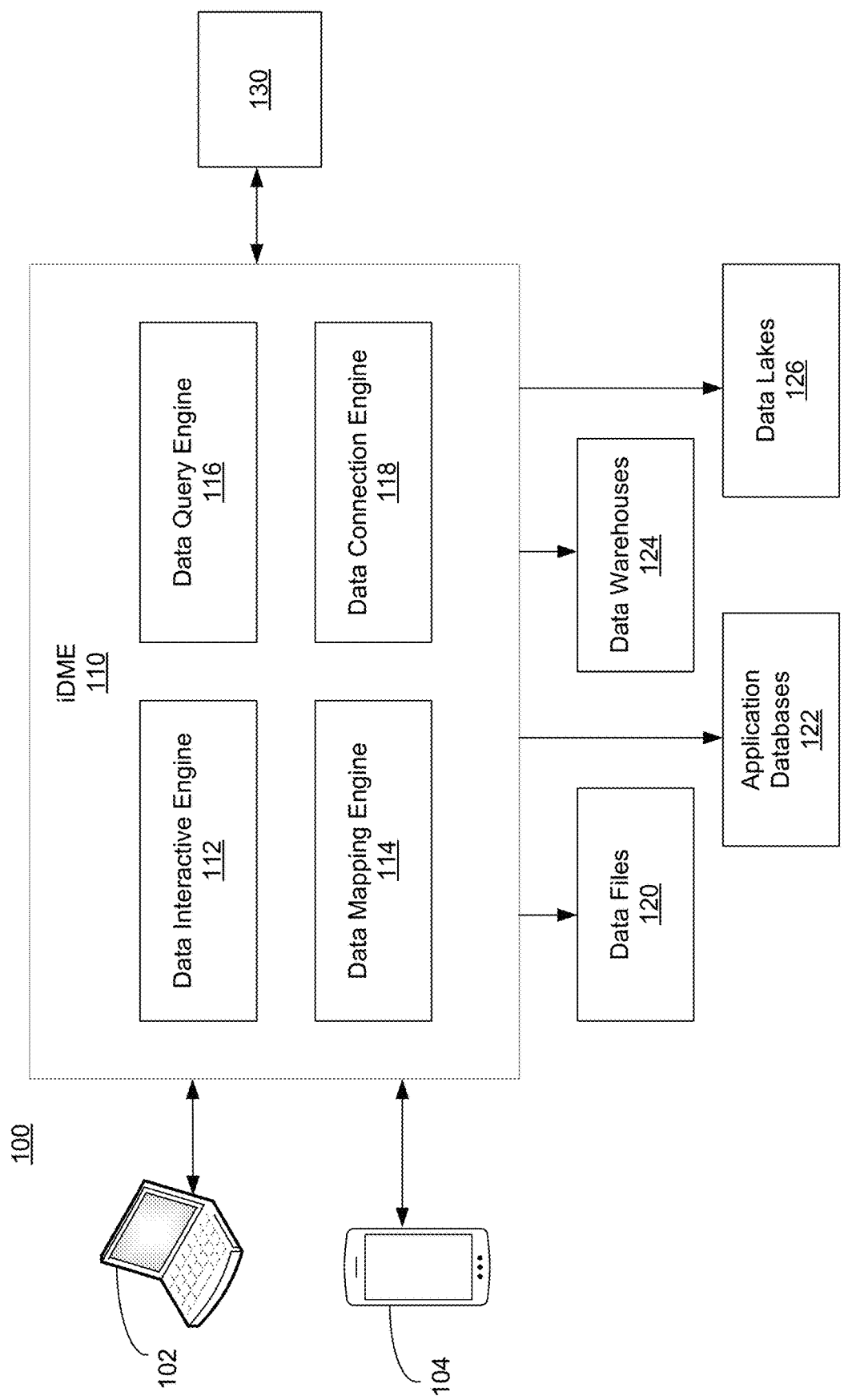
FIG. 1 illustrates an exemplary system that may implement an interactive dynamic mapping engine (iDME) for business intelligence.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

An Interactive Dynamic Mapping Engine (iDME) for business intelligence may interactively retrieve network-related information (e.g., regarding telecommunication data) intelligently for users who have no knowledge about data sources and database schema. For example, the user may convey an information request via natural languages. For the examples set forth herein, inputs based on natural language processing are described. It will be understood that the inputs to the iDME system may take other forms, including, but not limited to, graphical user interfaces or typed commands. Unlike queries that are pre-created (e.g., where the back-end design relies on an algorithm that is static), machine learning may be used to adapt the iDME, such that the iDME may "self-learn" and "unlearn" based on individual data query patterns. In some examples, the iDME may tailor the return response to the individual user, and not a "canned" response for anyone that asks a similar question. Thus, individual users may obtain at their respective user devices a response that is "tailored" to them.

The disclosure provides a base that is built from network inventory domain knowledge. This base may be used to construct few commonly used requests. The Machine Learning model may learn the user's request pattern through the translated-request confirmation interaction and to build the individual user request profile with frequently used keywords/patterns. Weights may be assigned to the pattern based on usage frequencies, timestamps, and other factors. Collectively, the base can also grow along with the individual request profile growth.

The disclosure provides a system and method that converts data processing into two models: interactive model and dynamic mapping model. The interactive model provides a real-time interactive Q&A session with the user to enter questions (data inquiries), while the domain knowledge and the data mappings are unknown to the user.

The disclosure provides practical applications of advances to the technology associated with machine learning. For example, adapting machine learning algorithms for queries to a plurality and variety of data sources in a variety of data formats based on user profiles or user role or position profiles is at least one practical application of the present disclosure. Moreover, the disclosure advances the state of technology as it relates to data base access functionality.

In some examples, the iDME may intelligently retrieve information and transmit retrieved information to user devices across organizations, platforms, and roles based on a self-learning, adaptive machine learning algorithm, e.g., that self-learns and unlearns based on individual user pattern queries. For example, a telecommunication company may have many organizations which have various data stored in several data bases utilizing several different storage technologies. These variations may result in a use of various terminologies across organizations, both within the company and outside. In an example, the iDME may map these various terminologies to a specific terminology that a specific data source can understand.

In addition to this intelligence, the iDME may profile the role (e.g., position within an organization) of the user and predict what kind of data the user may be requesting. For example, the machine learning algorithm may self-learn and adapt to an individual user's request so that subsequent queries and responses to these queries are tailored to the individual user.

The iDME may perform interactively with user devices in such a way that each user device may not need knowledge of a specific data source or data construct. In some examples, the iDME performs data mappings across multiple data sources, such as organizations and platforms, while providing one or more end users the flexibility to tailor outputs based on their individual preferences and roles. For example, the IDME may receive a request from a capacity user agent in plain English. The capacity user agent's request may be for a given service (e.g., capacity availability) in a given region for a given customer. The iDME may translate the received request into a set of data queries, e.g., consisting of service constraints (e.g., AVPN), geographic constraints (e.g., state=GA), a Common Language Location Indicator (CLLI), etc. The data queries may include data sources such as network inventory systems, network provision systems, etc. Moreover, the iDME may provide an elastic machine learning model and robust engines to interact with user devices. In some examples, besides providing flexibility to customize the data sources and output contents to meet business needs, the iDME may also provide further technological advancements over conventional one-size-fits-all data outputs (e.g., where only a portion of the contents are useful or users are unsatisfied due to missing or unavailable output information).

In some examples, the iDME converts data processing into multiple models, e.g., an interactive model and a dynamic mapping model. For example, the interactive model may provide an interactive question and answer session with a user device to enter questions (e.g., data inquiries), while the domain knowledge and the data mappings are unknown to the user device. In some examples, the dynamic mapping model may receive inputs from a user device in natural language and dynamically translate them into data mappings.

In some examples, the iDME may design and develop self-learning and unlearning capability of a trained data mapping model to enable the model to be customized on an individual user basis. Thus, the end user may not need to understand any of the technical details or domain knowledge, but still be enabled to obtain the desired information for actable decision based on natural language queries. In some examples, the iDME has multiple layers, e.g., a base layer, a learning layer, and an evaluation layer.

FIG. 1 illustrates an exemplary system 100 that may implement an iDME 110 for business intelligence (e.g., strategies and technologies used by enterprises for the data analysis of business information). System 100 may include a computing device 102 or a mobile device 104 that may connect iDME 110 via a network. Moreover, the iDME may include multiple physical and virtual devices that may be communicatively connected with each other. In some examples, a variety of or multiple data sources linked to or utilized by the iDME 110 may include data files 120, application databases 122, data warehouses 124, or data lakes 126. In some examples, the iDME 110 may communicate via the network with one or more neighboring systems 130.

As shown in FIG. 1, examples of the iDME may include one or more engines, including a data interactive engine 112, a data mapping engine 114, a data query engine 116, and a data connection engine 118. Moreover, the one or more engines may be located on a single device (physical or virtual) or distributed over multiple devices. For example, data interactive engine 112 and data mapping engine 114 may be on the same device or may have dedicated devices for each. The engines may be secured by firewall-like entities that may be physical entities or virtual entities (e.g., virtual machine or virtual network functions). iDME 110 may coordinate the security among one or more engines, computing device 102, or mobile device 104, which may alter the traffic flow or execution of commands between or within engines or devices (e.g., data interactive engine 112, data mapping engine 114, data query engine 116, data connection engine 118, computing device 102, or mobile device 104).

The data interactive engine 112 may interface with the computing device 102 or mobile device 104. The data interactive engine 112 may utilize natural language processing to receive an input from the user in a natural language format and translate that input to an output to be understood by the other components of the iDME. The data interactive engine 112 may also be in communication with a profile database (not shown) which may include a user profile and/or a role profile. The profile database may be used by the data interactive engine 112 to assist in the natural language processing algorithm to facilitate the generation of the query based on the natural language input and the profile database.

In some examples, the data mapping engine 114 may map a user request to a specific data source or specific technical terminology used by a data source. Moreover, the data mapping engine 114 may map the user profile to a type of information that the user typically accesses in order to predict a type of information that the user is seeking or desires (e.g., based on the user's role or position). In some examples, the data mapping engine 114 may include a machine language algorithm which may be trained based on a typical type of query associated with a user device 104 to enable the data mapping engine 114 to more readily anticipate or predict the type of query associated with that particular user device. It should be noted that the machine learning algorithm may be based on an individual user and associated user profile or based on a device being used by multiple individuals. For example, in the former case, the machine learning algorithm may adapt to an individual and, over time, learn and unlearn the types of queries normally posed by the individual associated with the user device. In the latter case, the machine learning algorithm may adapt over time to learn and unlearn the types of queries from a shared computing device 102, such as a user station associated with a dispatch function, a customer service function, or any other function in which multiple individuals are using a common user station to provide the same or similar services. Thus, the iDME 110 may respond with increasing accuracy about what information is being requested from a user or user device 104 or computing device 102. Unless otherwise stated, reference herein to a user will include a user device and vice-versa, and references to either will include the computing device 102.

In some examples, a data query engine 116 may generate queries based on requests from the data mapping engine 114. For example, the data query engine 116 may, based on a request from the data mapping engine 114, retrieve a static predefined query or may dynamically generate a query (e.g., depending on a recommendation from the data mapping engine 114). In some examples, a data connection engine 118 may connect to a data source recommended by the data mapping engine 114. The data connection engine may be in communication with one or more data sources, including, for example, data files 120, application databases 122, data warehouses 124 and data lakes 126. In an aspect, the inputs from the user may be in natural language and the iDME 110 will use natural language processing to determine the query of interest independent of the location and format of the requested data, leaving it to the data connection engine 118 to translate the natural language request to a specific query of one or more of the data sources in a format that is understood by the one or more data sources.

Figure 2:
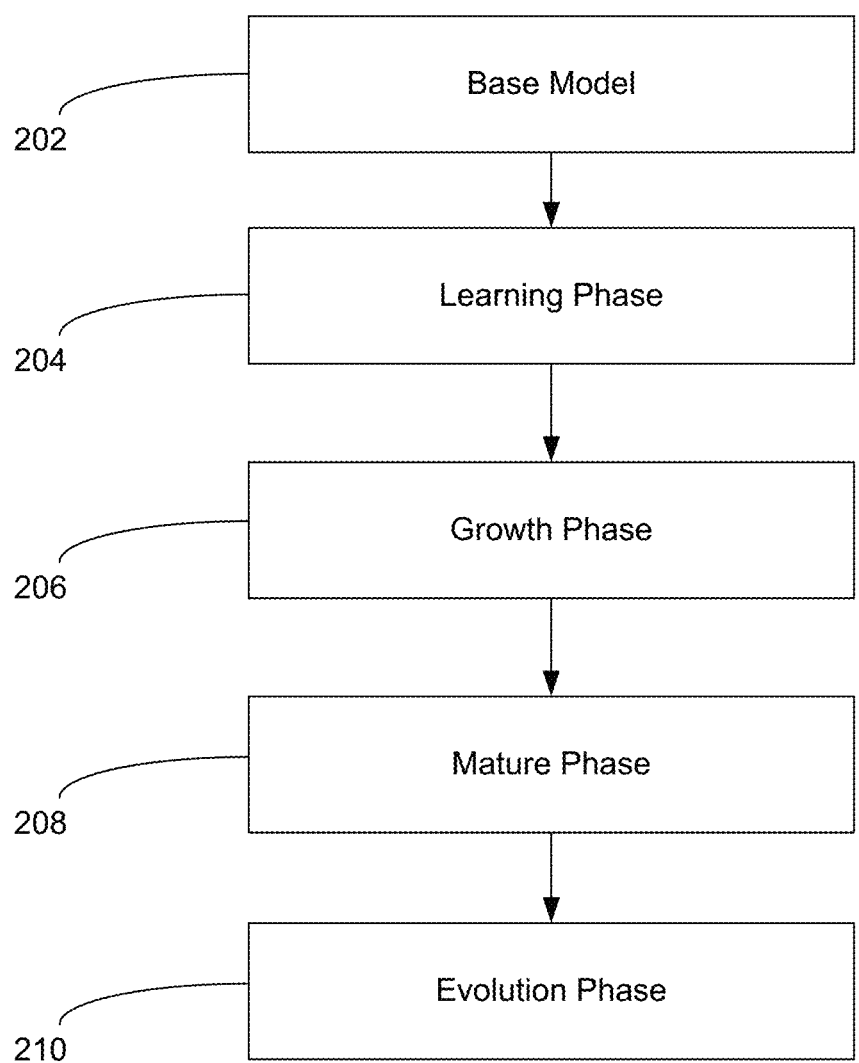
FIG. 2 illustrates an exemplary machine self-learning process flow for the iDME.

FIG. 2 illustrates an example of managing a self-learning process flow 200 for the iDME 110. In some examples, a starting point for the machine self-learning process flow 200 is with a base model ($M_1$) 202. For example, at the phase of the base model ($M_1$) 202, a machine learning (ML) model may be trained with initial domain knowledge. Thus, the base model ($M_1$) 202 may provide a starting knowledge base for novice users, e.g., users for whom ML models have not been previously developed.

At a learning phase 204 of the self-learning process flow 200, the ML model may collect data such as inputs from a user device. Moreover, the learning phase 204 may include building one or more user query profiles.

At a growth phase 206 of the self-learning process flow 200, any learned patterns (e.g., resulting from data collection at the learning phase 204) may be integrated with the base model ($M_1$) processing step 202. Furthermore, the growth phase 206 may stage a new self-learning model, e.g., by incorporating learned patterns with the base model ($M_1$) shown as 302 in FIG. 3.

At a mature phase 208 of the self-learning process flow 200, the self-learning process 200 may perform evaluation operations. For example, the self-learning process 200 may continue to collect feedback for a satisfaction comparison. In some examples, feedback may include information regarding a selection of one or more results to a query, a ranking of a selected result, or abandonment of a query. For example, the self-learning process flow 200 may learn by identifying that a selected result was associated with a high or low ranking in order to optimize the model (e.g., to prioritize learned patterns associated with selected results). In another example, the self-learning process flow 200 may identify that a query was abandoned (e.g., no results were selected, and a new query was received) and may adjust the model to deemphasize learned patterns or results associated with an abandoned query.

Moreover, the self-learning process 200 may operate with multiple ML models, e.g., a dual ML model including the base model ($M_1$) 302 and a self-learned model (e.g., $M_2$). Moreover, the self-learning process 200 may operate with any number n of machine learning models (e.g., $M_1$, $M_2$, . . . , $M_n$). In some examples, the self-learning process flow 200 may graduate a self-learning model (e.g., $M_1$, $M_2$, etc.). to become the matured model.

At an evolution phase 210 of the self-learning process flow, the self-learning process 200 may perform self-evolution operations. For example, matured usage patterns may be integrated with the base model ($M_1$) 302. Moreover, a matured model may be activated as a new base model for future evolutions. Thus, the base model ($M_1$) 302 would then incorporate any learned patterns associated with the matured self-learning model.

Figure 3:
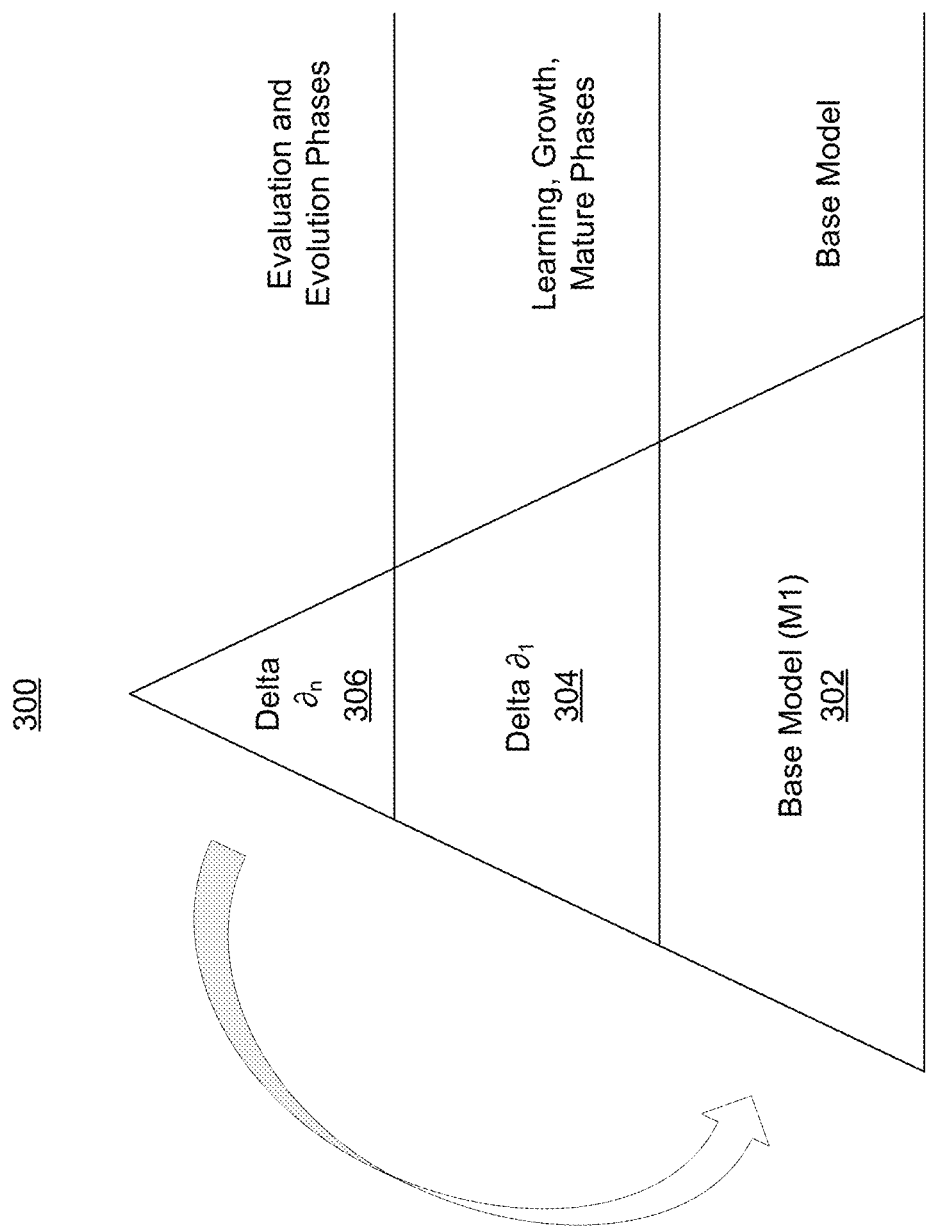
FIG. 3 illustrates an exemplary evolution of models in an iDME ecosystem.

As illustrated in FIG. 3, an exemplary iDME ecosystem evolution 300 includes a base model ($M_1$) 302 (e.g., at the base model phase 202), a Delta $\partial_1$ model 304 (e.g., at the learning phase 204, growth phase 206, or mature phase 208), and a Delta $\partial n$ model 306 (e.g., at the evolution phase 210). Thus, as described with respect to the self-learning process flow 200, the base model ($M_1$) 302 may incorporate learned patterns into the base model ($M_1$) 302 to become a matured Delta $\partial_1$ model 304. Moreover, any number n of models (e.g., Delta $\partial n$ model 306) may continue to evolve and mature.

Figure 4:
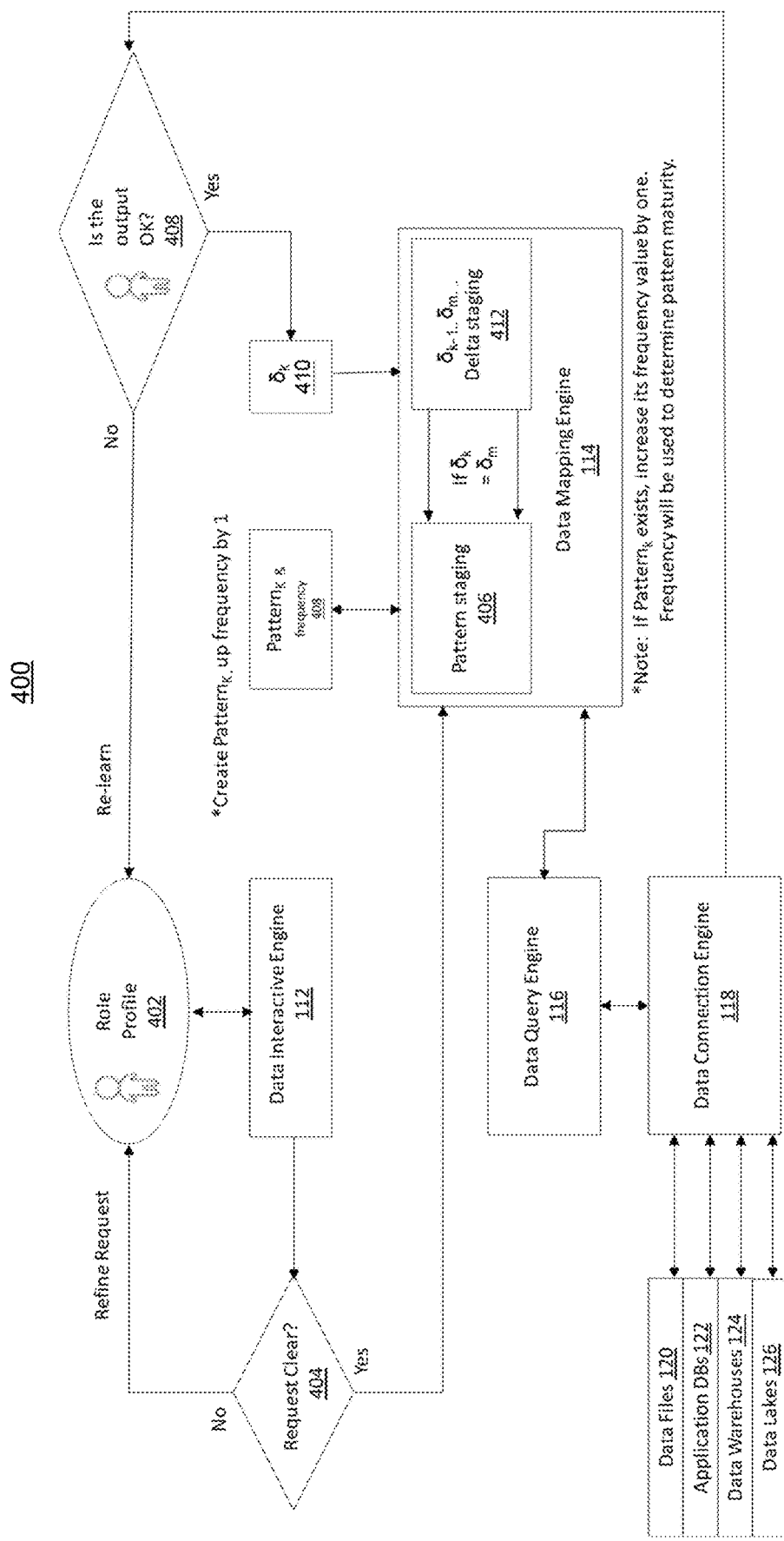
FIG. 4 illustrates an exemplary self-learning data flow for a role profile.

FIG. 4 illustrates an exemplary self-learning data flow 400, e.g., for a given role profile 402. For example, the given role profile 402 may identify the tasks that make up a user's role, e.g., within an organization. Note that in this exemplary data flow, the role profile 402 is used. It is understood that the role profile may pertain to one or more users in that particular role. However, this data flow may incorporate access to a specific user profile which may include one or more roles of that user. As such, the exemplary data flow is not meant to be limiting in this regard. In an example, the iDME 110 may perform the self-learning data flow 400 and a user having a role profile matching the given role profile may interact with the data interactive engine 112 by submitting a query. For example, the query submitted by the user device may be for a type of data consistent with the role of the user. Moreover, the query submitted by the user device may be in a natural language consistent with the role of the user.

At decision block 404, the self-learning data flow 400 may determine if the request is clear, e.g., whether the request includes enough information (e.g., non-conflicting) to perform the search. For example, if the request is not clear, the self-learning data flow 400 may refine the request by requesting clarification or additional information from the user device associated with the role profile 402. If the request is clear at decision block 404, the request may be directed to the data mapping engine 114.

The data mapping engine 114 may map user requests to commonly used technical terms. The data mapping engine 114 may also include a pattern staging block 406. For example, the pattern staging block 406 may check to see if a pattern exists (e.g., $pattern_K$ & frequency 408). In an example, a pattern occurrence may be identified based on a frequency value, where the frequency value is increased by one each time the same pattern is identified. Moreover, the frequency value may be used to determine pattern maturity.

The data query engine 116 may receive the mapped user request from the data mapping engine 114 and may generate one on more queries based on the mapped user request. The data query engine 116 may then communicate the data query to the data connection engine 118, which may connect to data sources such as data files 120, application databases 122, data warehouses 124, or data lakes 126.

The data connection engine 118 may direct the output of the data query to a device associated with the user device (e.g., a mobile device) and, at decision block 408, it may be determined that the output is sufficient (e.g., by a cloud computing device based on reaching a threshold metric). For example, a request may be transmitted to the user device to rate or assess the output. In an example, the output may be rated based on follow-up searches, etc. If it is determined that the output is not adequate at decision block 408, re-learning may take place by returning to the user profile 402. If it is determined that the output is adequate at decision block 408, the query may be used to update a delta model associated with the query (e.g., $\delta_k$ 410). Moreover, the delta model associated with the query may be used to adjust the model for future queries (e.g., based on pattern maturity at delta staging 412).

Figure 5A:
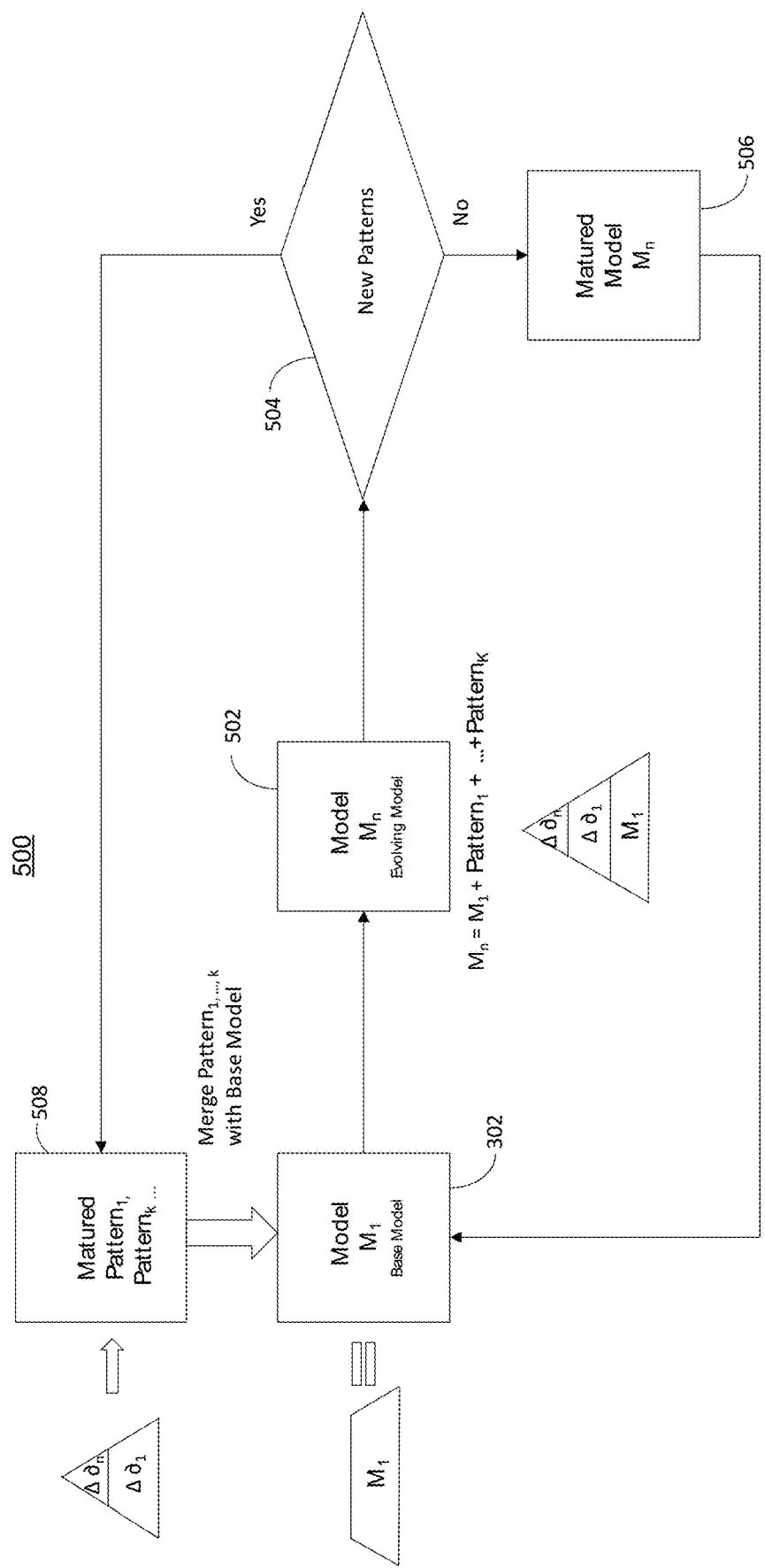
FIG. 5A illustrates an exemplary evolution of a model for a given role profile.
Figure 5B:
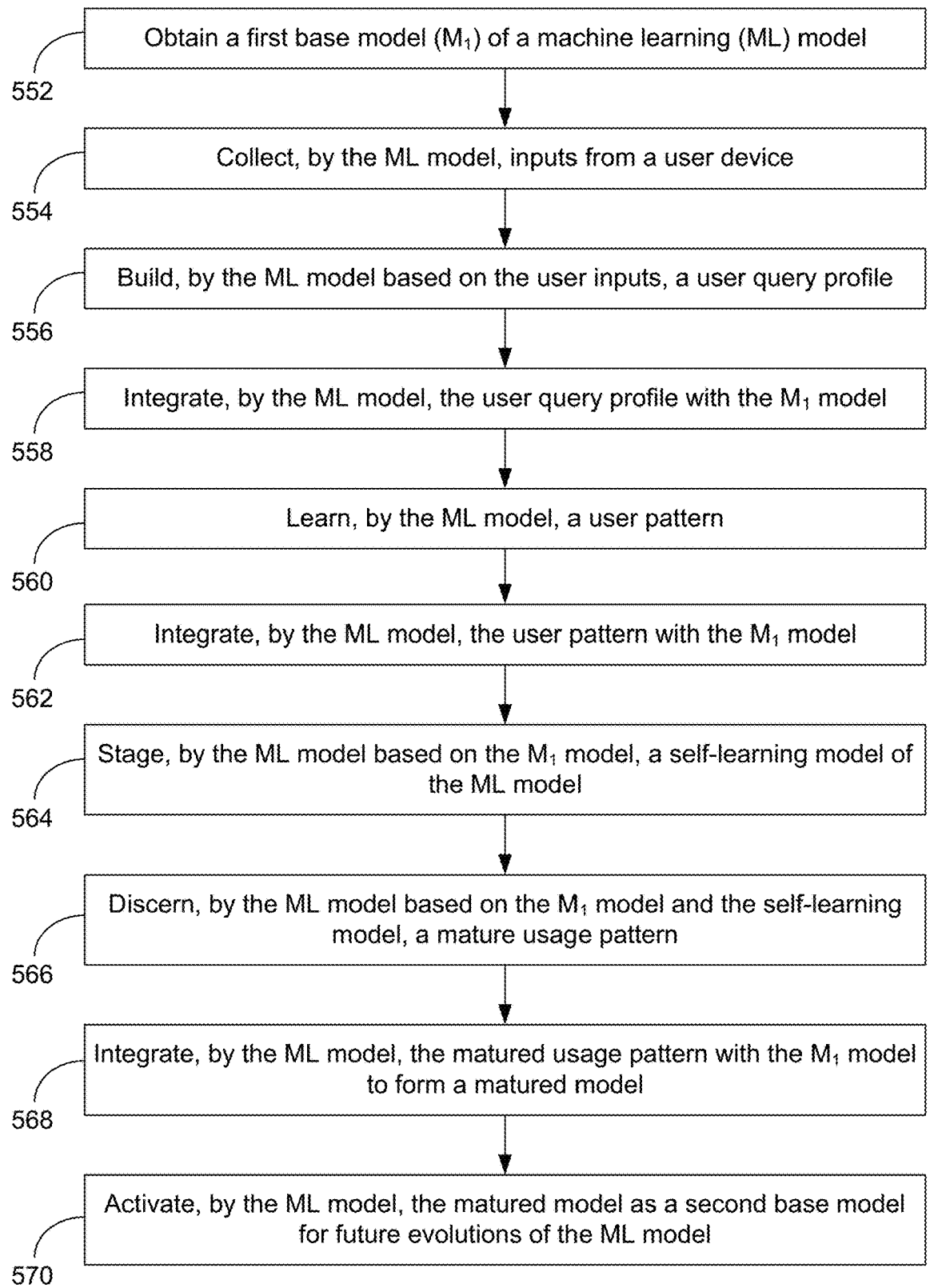
FIG. 5B is a flowchart illustrating an exemplary method of providing for an iDME for business intelligence.

As illustrated in FIG. 5A, an exemplary evolution process 500 of a model for a given role profile (e.g., role profile 402) may begin with base model ($M_1$) 302. An initial pattern may be merged with the base model $M_1$ to form an evolving model 502 (e.g., model $M_n$). For example, the evolving model $M_n$ may be derived based on base model ($M_1$) 302 and a first pattern, a second pattern, etc. In an example, the patterns may continue to a variable number of patterns (e.g., $pattern_K$).

If a pattern is determined to be a new pattern at decision block 504, the pattern may be compared or merged with a matured pattern at 508. In an example, a matured pattern may be reached when a frequency for that pattern reaches a threshold value (e.g., $p_t=5$). The matured patterns may then be incorporated with the base model ($M_1$) 302.

If the pattern is not determined to be a new pattern at decision block 504, the pattern may be incorporated with a matured model $M_n$ at block 506. In an example, a matured model is reached when the number of matured patterns reaches a threshold value (e.g., $M_1=10$). The matured model may then be incorporated with the base model ($M_1$) 302.

FIG. 9 is a flowchart illustrating an exemplary method 550 of providing for an iDME for business intelligence. In some examples, the method 550 is performed by a device or machine (e.g., device 600 or computer system 700). Moreover, the method 550 may be performed at a network device, UE, desktop, laptop, mobile device, server device, or by multiple devices in communication with one another. In some embodiments, the method 550 is performed by processing logic, including hardware, firmware, software, or a combination thereof. In some embodiments, the method 550 is performed by a processor executing code stored in a computer-readable medium (e.g., a memory).

At block 552, the method 550 obtains a first base model of a machine learning model. For example, a base model may include initial domain knowledge or a starting knowledge base for novice users.

At block 554, the method 550 may collect inputs (e.g., by the machine learning model) from a user device.

At block 556, the method 550 may build (e.g., by the machine learning model based on the user inputs) a user query profile.

At block 558, the method 550 may integrate (e.g., by the machine learning model) the user query profile with the first base model of the machine learning model;

At block 560, the method 550 may learn (e.g., by the machine learning model) a user pattern. For example, the user pattern may be learned based on determining a number of user inputs satisfies a pattern threshold.

At block 562, the method 550 may integrate (e.g., by the machine learning model) the user pattern with the first base model of the machine learning model.

At block 564, the method 550 may stage (e.g., by the machine learning model based on the first base model) a self-learning model of the machine learning model.

At block 566, the method 550 may discern (e.g., by the machine learning model based on the first base model and the self-learning model) a mature usage pattern. For example, learning the mature usage pattern may include determining a number of matured patterns reaches matured pattern threshold value; collecting user feedback for satisfaction comparison, etc.

At block 568, the method 550 may integrate (e.g., by the machine learning model) the mature usage pattern with the first base model to form a matured model.

At block 570, the method 550 may activate (e.g., by the machine learning model) the matured model as a second base model for future evolutions of the machine learning model.

Figure 6:
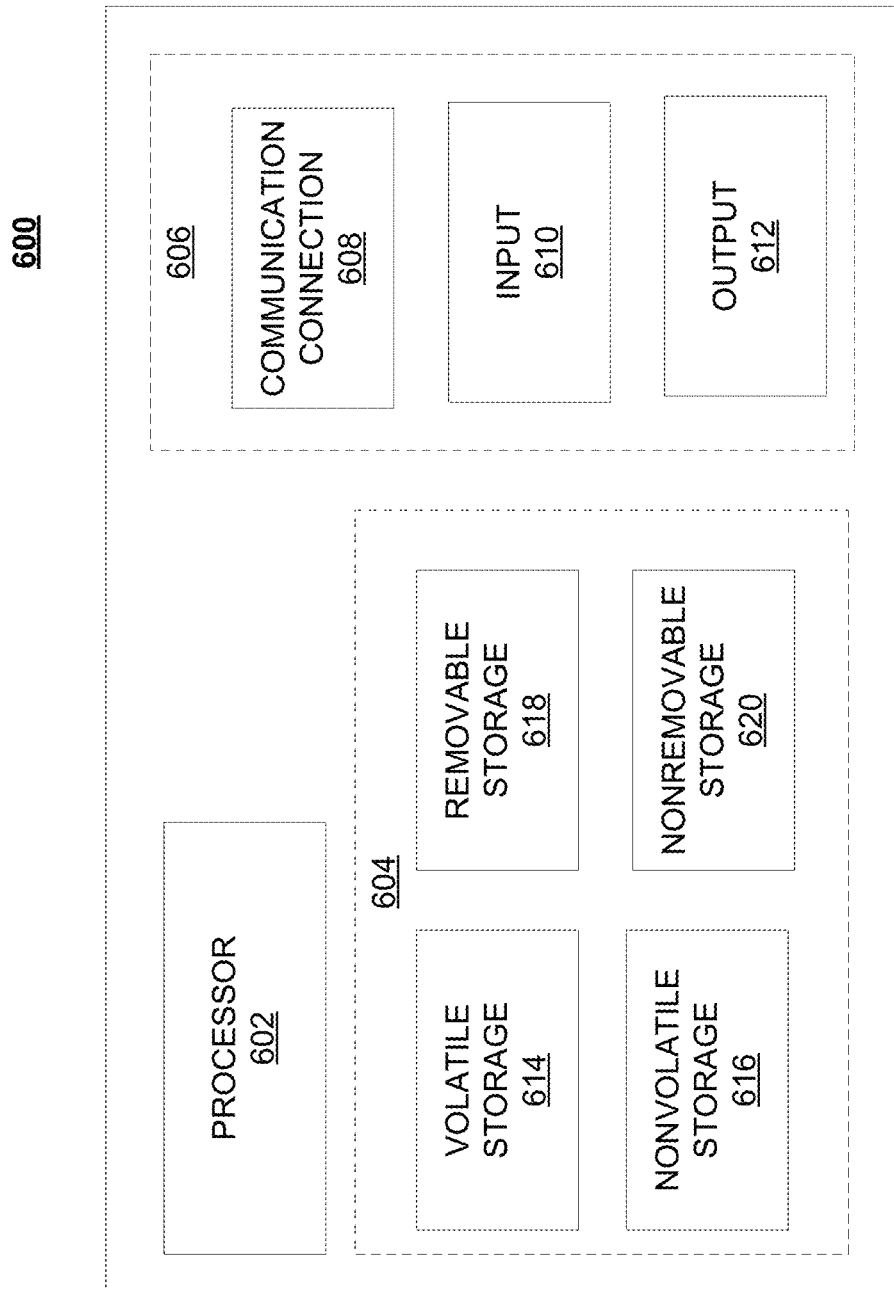
FIG. 6 illustrates a schematic of an exemplary network device.

FIG. 6 is a block diagram of network device 600 that may be connected to or comprise a component of communication system 100. Network device 600 may comprise hardware or a combination of hardware and software. The functionality to facilitate telecommunications via a telecommunications network may reside in one or a combination of network devices 600. Network device 600 depicted in FIG. 6 may represent or perform functionality of an appropriate network device 600, or a combination of network devices 600, such as, for example, a component or various components of a cellular broadcast system wireless network, a processor, a server, a gateway, an LTE or 5G anchor node or eNB, a mobile switching center (MSC), a short message service center (SMSC), an automatic location function server (ALFS), a gateway mobile location center (GMLC), a serving gateway (S-GW) 430, a packet data network (PDN) gateway, an RAN, a serving mobile location center (SMLC), or the like, or any appropriate combination thereof. It is emphasized that the block diagram depicted in FIG. 6 is exemplary and not intended to imply a limitation to a specific example or configuration. Thus, network device 600 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 600 may comprise a processor 602 and a memory 604 coupled to processor 602. Memory 604 may contain executable instructions that, when executed by processor 602, cause processor 602 to effectuate operations associated with mapping wireless signal strength. As evident from the description herein, network device 600 is not to be construed as software per se.

In addition to processor 602 and memory 604, network device 600 may include an input/output system 606. Processor 602, memory 604, and input/output system 606 may be coupled together (coupling not shown in FIG. 6) to allow communications between them. Each portion of network device 600 may comprise circuitry for performing functions associated with each respective portion. Thus, each portion may comprise hardware, or a combination of hardware and software. Accordingly, each portion of network device 600 is not to be construed as software per se. Input/output system 606 may be capable of receiving or providing information from or to a communications device or other network entities configured for telecommunications. For example, input/output system 606 may include a wireless communications (e.g., 3G/4G/5G/GPS) card. Input/output system 606 may be capable of receiving or sending video information, audio information, control information, image information, data, or any combination thereof. Input/output system 606 may be capable of transferring information with network device 600. In various configurations, input/output system 606 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 606 may comprise a Wi-Fi finder, a two-way GPS chipset or equivalent, or the like, or a combination thereof.

Input/output system 606 of network device 600 also may contain a communication connection 608 that allows network device 600 to communicate with other devices, network entities, or the like. Communication connection 608 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 606 also may include an input device 610 such as keyboard, mouse, pen, voice input device, or touch input device. Input/output system 606 may also include an output device 612, such as a display, speakers, or a printer.

Processor 602 may be capable of performing functions associated with telecommunications, such as functions for processing broadcast messages, as described herein. For example, processor 602 may be capable of, in conjunction with any other portion of network device 600, determining a type of broadcast message and acting according to the broadcast message type or content, as described herein.

Memory 604 of network device 600 may comprise a storage medium having a concrete, tangible, physical structure. As is known, a signal does not have a concrete, tangible, physical structure. Memory 604, as well as any computer-readable storage medium described herein, is not to be construed as a signal. Memory 604, as well as any computer-readable storage medium described herein, is not to be construed as a transient signal. Memory 604, as well as any computer-readable storage medium described herein, is not to be construed as a propagating signal. Memory 604, as well as any computer-readable storage medium described herein, is to be construed as an article of manufacture.

Memory 604 may store any information utilized in conjunction with telecommunications. Depending upon the exact configuration or type of processor, memory 604 may include a volatile storage 614 (such as some types of RAM), a nonvolatile storage 616 (such as ROM, flash memory), or a combination thereof. Memory 604 may include additional storage (e.g., a removable storage 618 or a non-removable storage 620) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 600. Memory 604 may comprise executable instructions that, when executed by processor 602, cause processor 602 to effectuate operations to map signal strengths in an area of interest.

Figure 7:
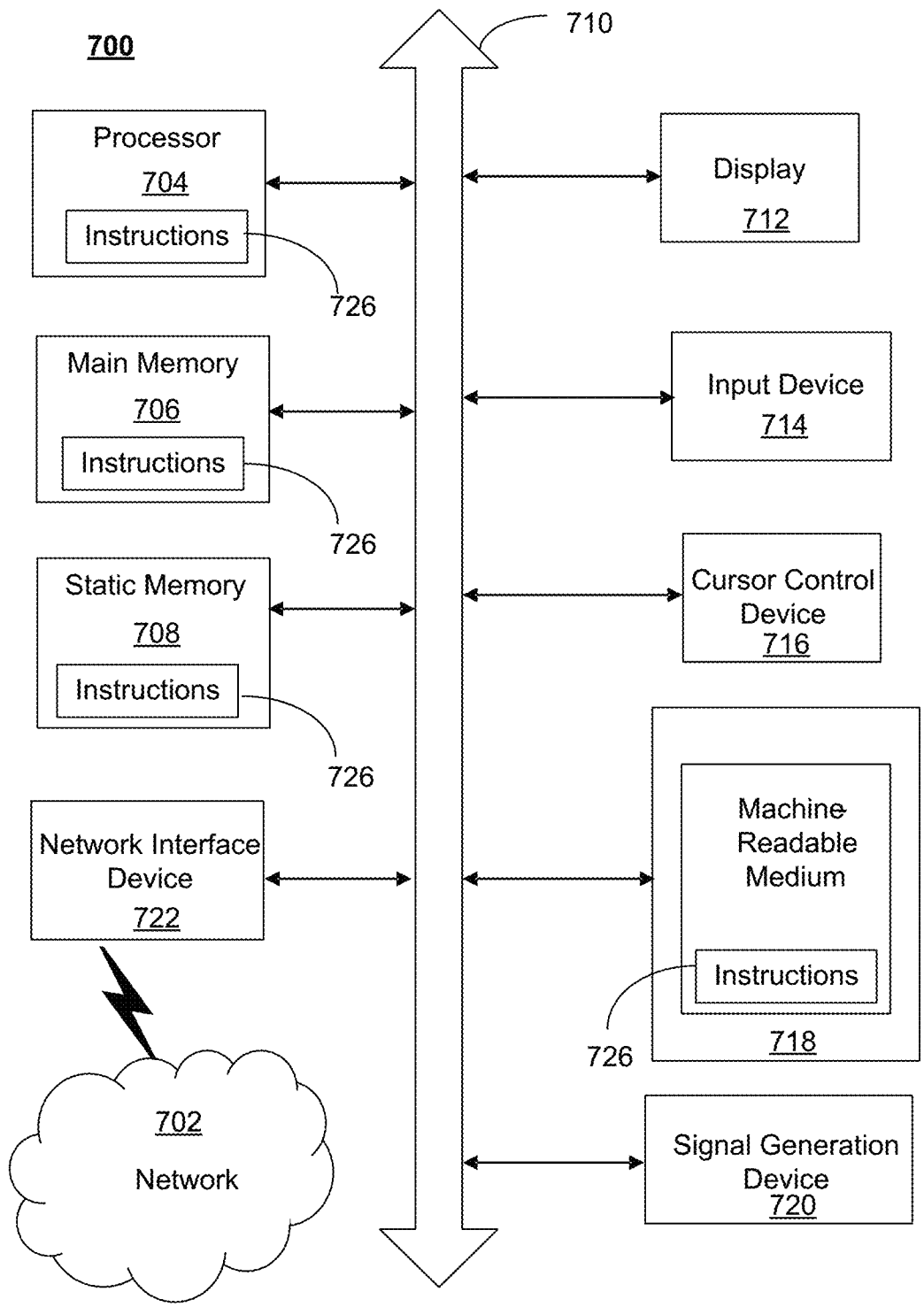
FIG. 7 illustrates an exemplary communication system that provides wireless telecommunication services over wireless communication networks.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as processor 602 and other devices of FIG. 1, FIG. 2, FIG. 3, FIG. 4, FIG. 5A, FIG. 5B, and FIG. 6. In some examples, the machine may be connected (e.g., using a network 702) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 700 may include a processor (or controller) 704 (e.g., a central processing unit (CPU)), a graphics processing unit (GPU, or both), a main memory 706 and a static memory 708, which communicate with each other via a bus 710. The computer system 700 may further include a display unit 712 (e.g., a liquid crystal display (LCD), a flat panel, or a solid-state display). Computer system 700 may include an input device 714 (e.g., a keyboard), a cursor control device 716 (e.g., a mouse), a disk drive unit 718, a signal generation device 720 (e.g., a speaker or remote control) and a network interface device 722. In distributed environments, the examples described in the subject disclosure can be adapted to utilize multiple display units 712 controlled by two or more computer systems 700. In this configuration, presentations described by the subject disclosure may in part be shown in a first of display units 712, while the remaining portion is presented in a second of display units 712.

The disk drive unit 718 may include a tangible computer-readable storage medium on which is stored one or more sets of instructions (e.g., instructions 726) embodying any one or more of the methods or functions described herein, including those methods illustrated above. Instructions 726 may also reside, completely or at least partially, within main memory 706, static memory 708, or within processor 704 during execution thereof by the computer system 700. Main memory 706 and processor 704 also may constitute tangible computer-readable storage media.

Figure 8A:
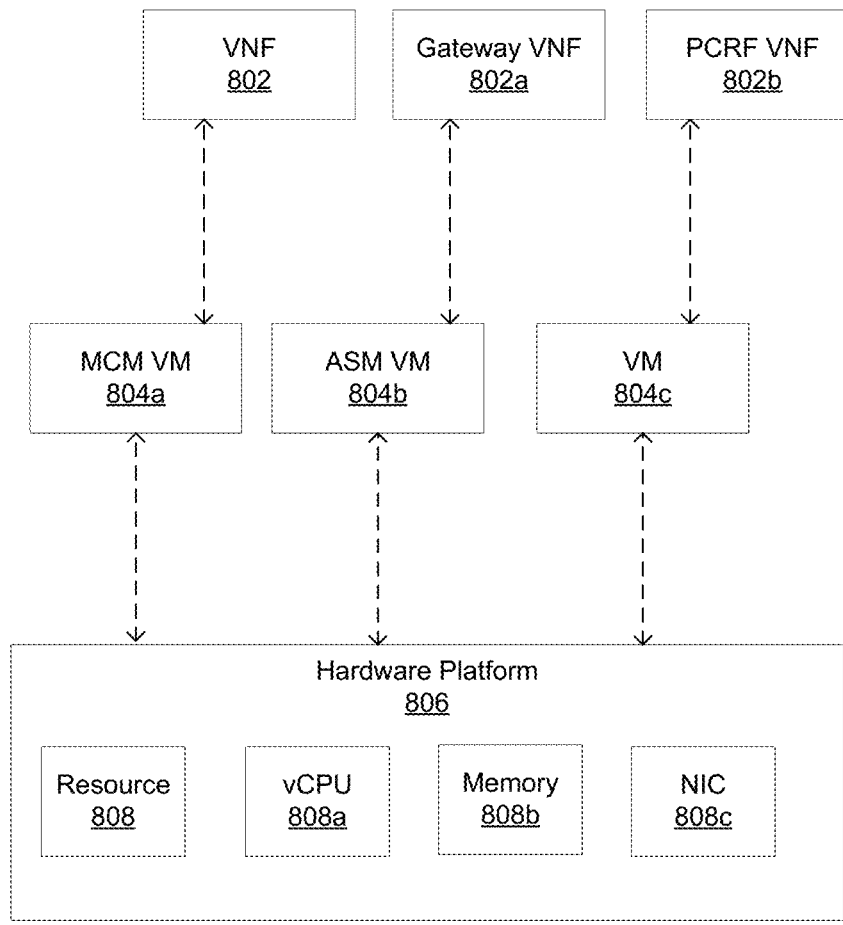
FIG. 8A is a representation of an exemplary software defined network.

FIG. 8A is a representation of an exemplary network 800. Network 800 may comprise an SDN—that is, network 800 may include one or more virtualized functions implemented on general purpose hardware, such as in lieu of having dedicated hardware for every network function. That is, general purpose hardware of network 800 may be configured to run virtual network elements to support communication services, such as mobility services, including consumer services and enterprise services. These services may be provided or measured in sessions.

A virtual network functions (VNFs) 802 may be able to support a limited number of sessions. Each VNF 802 may have a VNF type that indicates its functionality or role. For example, FIG. 8A illustrates a gateway VNF 802a and a policy and charging rules function (PCRF) VNF 802b. Additionally or alternatively, VNFs 802 may include other types of VNFs. Each VNF 802 may use one or more virtual machines (VMs) 804 to operate. Each VM 804 may have a VM type that indicates its functionality or role. For example, FIG. 8A illustrates a management control module (MCM) VM 804a, an advanced services module (ASM) VM 804b, and a DEP VM 804c. Additionally or alternatively, VMs 804 may include other types of VMs. Each VM 804 may consume various network resources from a hardware platform 806, such as a resource 808, a virtual central processing unit (vCPU) 808a, memory 808b, or a network interface card (NIC) 808c. Additionally or alternatively, hardware platform 806 may include other types of resources 808.

While FIG. 8A illustrates resources 808 as collectively contained in hardware platform 806, the configuration of hardware platform 806 may isolate, for example, certain memory 808c from other memory 808c. FIG. 8B provides an exemplary implementation of hardware platform 806.

Hardware platform 806 may comprise one or more chasses 810. Chassis 810 may refer to the physical housing or platform for multiple servers or other network equipment. In an aspect, chassis 810 may also refer to the underlying network equipment. Chassis 810 may include one or more servers 812. Server 812 may comprise general purpose computer hardware or a computer. In an aspect, chassis 810 may comprise a metal rack, and servers 812 of chassis 810 may comprise blade servers that are physically mounted in or on chassis 810.

Each server 812 may include one or more network resources 808, as illustrated. Servers 812 may be communicatively coupled together (not shown) in any combination or arrangement. For example, all servers 812 within a given chassis 810 may be communicatively coupled. As another example, servers 812 in different chasses 810 may be communicatively coupled. Additionally or alternatively, chasses 810 may be communicatively coupled together (not shown) in any combination or arrangement.

The characteristics of each chassis 810 and each server 812 may differ. For example, FIG. 8B illustrates that the number of servers 812 within two chasses 810 may vary. Additionally or alternatively, the type or number of resources 810 within each server 812 may vary. In an aspect, chassis 810 may be used to group servers 812 with the same resource characteristics. In another aspect, servers 812 within the same chassis 810 may have different resource characteristics.

Given hardware platform 806, the number of sessions that may be instantiated may vary depending upon how efficiently resources 808 are assigned to different VMs 804. For example, assignment of VMs 804 to particular resources 808 may be constrained by one or more rules. For example, a first rule may require that resources 808 assigned to a particular VM 804 be on the same server 812 or set of servers 812. For example, if VM 804 uses eight vCPUs 808a, 1 GB of memory 808b, and 2 NICs 808c, the rules may require that all of these resources 808 be sourced from the same server 812. Additionally or alternatively, VM 804 may require splitting resources 808 among multiple servers 812, but such splitting may need to conform with certain restrictions. For example, resources 808 for VM 804 may be able to be split between two servers 812. Default rules may apply. For example, a default rule may require that all resources 808 for a given VM 804 must come from the same server 812.

An affinity rule may restrict assignment of resources 808 for a particular VM 804 (or a particular type of VM 804). For example, an affinity rule may require that certain VMs 804 be instantiated on (that is, consume resources from) the same server 812 or chassis 810. For example, if VNF 802 uses six MCM VMs 804a, an affinity rule may dictate that those six MCM VMs 804a be instantiated on the same server 812 (or chassis 810). As another example, if VNF 802 uses MCM VMs 804a, ASM VMs 804b, and a third type of VMs 804, an affinity rule may dictate that at least the MCM VMs 804a and the ASM VMs 804b be instantiated on the same server 812 (or chassis 810). Affinity rules may restrict assignment of resources 808 based on the identity or type of resource 808, VNF 802, VM 804, chassis 810, server 812, or any combination thereof.

An anti-affinity rule may restrict assignment of resources 808 for a particular VM 804 (or a particular type of VM 804). In contrast to an affinity rule—which may require that certain VMs 804 be instantiated on the same server 812 or chassis 810—an anti-affinity rule requires that certain VMs 804 be instantiated on different servers 812 (or different chasses 810). For example, an anti-affinity rule may require that MCM VM 804a be instantiated on a particular server 812 that does not contain any ASM VMs 804b. As another example, an anti-affinity rule may require that MCM VMs 804a for a first VNF 802 be instantiated on a different server 812 (or chassis 810) than MCM VMs 804a for a second VNF 802. Anti-affinity rules may restrict assignment of resources 808 based on the identity or type of resource 808, VNF 802, VM 804, chassis 810, server 812, or any combination thereof.

Within these constraints, resources 808 of hardware platform 806 may be assigned to be used to instantiate VMs 804, which in turn may be used to instantiate VNFs 802, which in turn may be used to establish sessions. The different combinations for how such resources 808 may be assigned may vary in complexity and efficiency. For example, different assignments may have different limits of the number of sessions that can be established given a particular hardware platform 806.

For example, consider a session that may require gateway VNF 802*a* and PCRF VNF 802*b*. Gateway VNF 802*a* may require five VMs 804 instantiated on the same server 812, and PCRF VNF 802*b* may require two VMs 804 instantiated on the same server 812. (Assume, for this example, that no affinity or anti-affinity rules restrict whether VMs 804 for PCRF VNF 802*b* may or must be instantiated on the same or different server 812 than VMs 804 for gateway VNF 802*a*.) In this example, each of two servers 812 may have sufficient resources 808 to support 10 VMs 804. To implement sessions using these two servers 812, first server 812 may be instantiated with 10 VMs 804 to support two instantiations of gateway VNF 802*a*, and second server 812 may be instantiated with 9 VMs: five VMs 804 to support one instantiation of gateway VNF 802*a* and four VMs 804 to support two instantiations of PCRF VNF 802*b*. This may leave the remaining resources 808 that could have supported the tenth VM 804 on second server 812 unused (and unusable for an instantiation of either a gateway VNF 802*a* or a PCRF VNF 802*b*). Alternatively, first server 812 may be instantiated with 10 VMs 804 for two instantiations of gateway VNF 802*a* and second server 812 may be instantiated with 10 VMs 804 for five instantiations of PCRF VNF 802*b*, using all available resources 808 to maximize the number of VMs 804 instantiated.

Consider, further, how many sessions each gateway VNF 802*a* and each PCRF VNF 802*b* may support. This may factor into which assignment of resources 808 is more efficient. For example, consider if each gateway VNF 802*a* supports two million sessions, and if each PCRF VNF 802*b* supports three million sessions. For the first configuration—three total gateway VNFs 802*a* (which satisfy the gateway requirement for six million sessions) and two total PCRF VNFs 802*b* (which satisfy the PCRF requirement for six million sessions)—would support a total of six million sessions. For the second configuration—two total gateway VNFs 802*a* (which satisfy the gateway requirement for four million sessions) and five total PCRF VNFs 802*b* (which satisfy the PCRF requirement for 15 million sessions)—would support a total of four million sessions. Thus, while the first configuration may seem less efficient looking only at the number of available resources 808 used (as resources 808 for the tenth possible VM 804 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 802 to support a session, a capacity for the number of sessions each VNF 802 (e.g., of a certain type) can support, a given requirement for VMs 804 for each VNF 802 (e.g., of a certain type), a give requirement for resources 808 to support each VM 804 (e.g., of a certain type), rules dictating the assignment of resources 808 to one or more VMs 804 (e.g., affinity and anti-affinity rules), the chasses 810 and servers 812 of hardware platform 806, and the individual resources 808 of each chassis 810 or server 812 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which call processing continuity can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes a device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

Embodiments of the methods disclosed herein may be performed in the operation of such computing devices. The order of the blocks presented in the examples above can be varied. For example, blocks can be re-ordered, combined, or broken into sub-blocks. Certain blocks or processes can be performed in parallel.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. A method comprising:
    defining a first base model of an adaptive machine learning model trained with initial domain knowledge;
    collecting, by the adaptive machine learning model, inputs from a user device, wherein the inputs include a query for data;
    building, by the adaptive machine learning model based on a pattern of the inputs, a user query profile, wherein the user query profile comprises learned patterns of queries;
    returning, by the adaptive machine learning model, a result of the query; and
    integrating, by the adaptive machine learning model, the user query profile with the first base model of the adaptive machine learning model responsive to a positive evaluation of the result of the query.

2. The method of claim 1 further comprising:
    staging, by the adaptive machine learning model based on the first base model and the query, a self-learning model of the adaptive machine learning model;
    discerning, by the adaptive machine learning model based on the first base model and the self-learning model, a mature usage pattern;
    integrating, by the adaptive machine learning model, the mature usage pattern with the first base model to form a matured model; and
    activating, by the adaptive machine learning model, the matured model as a second base model for future evolutions of the adaptive machine learning model.

3. The method of claim 2, wherein the initial domain knowledge comprises stored information about a telecommunications network inventory, and wherein the first base model includes a starting knowledge base for novice users.

4. The method of claim 3, wherein discerning the mature usage pattern is based on determining a number of user inputs satisfies a pattern threshold.

5. The method of claim 3, wherein discerning the mature usage pattern is based on determining a number of user inputs fail to satisfy a pattern threshold.

6. The method of claim 3, wherein discerning the mature usage pattern includes determining a number of matured patterns reaches a matured pattern threshold value.

7. The method of claim 6, wherein discerning the mature usage pattern includes adapting the mature usage pattern based on a satisfaction comparison.

8. The method of claim 3, further comprising evaluating, by the adaptive machine learning model, the result of the query, wherein discerning the mature usage pattern is based on the positive evaluation of the result of the query.

9. A system comprising:
    a processor; and
    a memory including instructions that, when executed by the processor, cause the system to:
    define a first base model of a machine learning model trained with initial domain knowledge;
    collect, by the machine learning model, inputs from a user device, wherein the inputs include a query for data;
    build, by the machine learning model based on a pattern of the inputs, a user query profile, wherein the user query profile comprises learned patterns of queries;
    return, by the machine learning model, a result of the query; and
    integrate, by the machine learning model, the user query profile with the first base model of the machine learning model responsive to a positive evaluation of the result of the query.

10. The system of claim 9 wherein the instructions are further configured to cause the system to:
    stage, by the machine learning model based on the first base model and the query, a self-learning model of the machine learning model;
    discern, by the machine learning model based on the first base model and the self-learning model, a mature usage pattern;
    integrate, by the machine learning model, the mature usage pattern with the first base model to form a matured model; and
    activate, by the machine learning model, the matured model as a second base model for future evolutions of the machine learning model.

11. The system of claim 10, wherein discerning the mature usage pattern is based on determining a number of user inputs satisfies a pattern threshold.

12. The system of claim 10, wherein discerning the mature usage pattern is based on determining a number of user inputs fail to satisfy a pattern threshold.

13. The system of claim 10, wherein discerning the mature usage pattern includes determining a number of matured patterns reaches a matured pattern threshold value.

14. The system of claim 10, wherein the instructions are further configured to cause the system to evaluate, by the machine learning model the result of the query, wherein discerning the mature usage pattern is based on the positive evaluation of the result of the query.

15. The system of claim 14, wherein discerning the mature usage pattern includes adapting the mature usage pattern based on a satisfaction comparison.

16. The system of claim 9, wherein the first base model includes a starting knowledge base for novice users.

17. A computer program product comprising:
a computer-readable storage medium; and
instructions stored on the computer-readable storage medium that, when executed by a processor, causes the processor to:
define a first base model of a machine learning model including initial domain knowledge;
collect, by the machine learning model, inputs from a user device, wherein the inputs include a query for data;
build, by the machine learning model based on a pattern of the inputs, a user query profile, wherein the user query profile comprises learned patterns of queries;
return, by the machine learning model, a result of the query; and
integrate, by the machine learning model, the user query profile with the first base model of the machine learning model responsive to a positive evaluation of the result of the query.

18. The computer program product of claim 17 wherein the instructions are further configured to cause the processor to:
stage, by the machine learning model based on the first base model and the query, a self-learning model of the machine learning model;
discern, by the machine learning model based on the first base model and the self-learning model, a mature usage pattern;
integrate, by the machine learning model, the mature usage pattern with the first base model to form a matured model; and
activate, by the machine learning model, the matured model as a second base model for future evolutions of the machine learning model.

19. The computer program product of claim 18, wherein discerning the mature usage pattern is based on determining a number of user inputs satisfies a pattern threshold.

20. The computer program product of claim 17, wherein the first base model includes a starting knowledge base for novice users.

* * * * *